US007646754B2

(12) United States Patent
McLaughlin et al.

(10) Patent No.: US 7,646,754 B2
(45) Date of Patent: Jan. 12, 2010

(54) MOBILE TELEPHONE NETWORK

(75) Inventors: Stephen McLaughlin, Edinburgh (GB); David Irvine Laurenson, Scottish Borders (GB); Yuefeng Zhou, Glasgow (GB)

(73) Assignee: The University Court of the University of Edinburgh, Edinburgh (GB)

( * ) Notice: Subject to any disclaimer, the term of this patent is extended or adjusted under 35 U.S.C. 154(b) by 463 days.

(21) Appl. No.: 11/043,540

(22) Filed: Jan. 25, 2005

(65) Prior Publication Data
US 2006/0034232 A1 Feb. 16, 2006

(30) Foreign Application Priority Data
Jan. 27, 2004 (GB) ................... 0401760.4

(51) Int. Cl.
*H04Q 7/24* (2006.01)
(52) U.S. Cl. .................... 370/338; 370/329; 370/352; 370/328; 370/208; 370/252; 370/412; 370/310; 370/348; 709/247; 709/224; 709/222; 709/200; 709/225; 455/262; 455/557; 455/426.1
(58) Field of Classification Search ................. 370/338, 370/330, 329, 328, 208, 252, 412, 310, 348, 370/352, 230; 709/222, 224, 247, 200, 225, 709/229; 455/562, 557, 426.1, 426; 280/735; 705/37
See application file for complete search history.

(56) References Cited

U.S. PATENT DOCUMENTS

| | | | |
|---|---|---|---|
| 6,621,805 B1* | 9/2003 | Kondylis et al. ............ 370/329 |
| 6,735,630 B1* | 5/2004 | Gelvin et al. ............... 709/224 |
| 6,768,718 B1* | 7/2004 | Beshai et al. ............... 370/237 |
| 6,894,991 B2 | 5/2005 | Ayyagari et al. |
| 6,944,121 B1* | 9/2005 | Weste et al. ................. 370/208 |
| 6,963,783 B1* | 11/2005 | Bi et al. ........................ 700/94 |
| 7,061,855 B2* | 6/2006 | Weste et al. ................. 370/208 |
| 7,277,414 B2* | 10/2007 | Younis et al. ............... 370/338 |
| 2002/0051425 A1* | 5/2002 | Larsson ...................... 370/252 |
| 2002/0071395 A1* | 6/2002 | Redi et al. ................... 370/252 |
| 2002/0080755 A1* | 6/2002 | Tasman et al. .............. 370/338 |
| 2002/0191573 A1* | 12/2002 | Whitehill et al. ............ 370/338 |

(Continued)

FOREIGN PATENT DOCUMENTS

WO WO 01/92992 A3 12/2001

(Continued)

OTHER PUBLICATIONS

Rahul C Shah, Energy aware routing for a low energy Ad Hoc sensor Network , Jun. 12, 2003,Berkley Wireless Research center. Univwersity of California, Berlkley.*

(Continued)

*Primary Examiner*—Rafael Pérez-Gutiérrez
*Assistant Examiner*—Joseph Arevalo
(74) *Attorney, Agent, or Firm*—Duane Morris LLP

(57) ABSTRACT

In a mobile ad hoc network, a method of routing data and a mobile unit for use according to the method are arranged to find the relay capacity of a node and the lifetime of the node, and thereby determine whether the node can relay the data. The method and unit can find the relay efficiency of nodes and this information is used to route data traffic efficiently through a number of nodes along a route.

11 Claims, 2 Drawing Sheets

U.S. PATENT DOCUMENTS

| | | | |
|---|---|---|---|
| 2003/0033394 A1* | 2/2003 | Stine | 709/222 |
| 2003/0063585 A1* | 4/2003 | Younis et al. | 370/331 |
| 2003/0100343 A1* | 5/2003 | Zourntos et al. | 455/562 |
| 2003/0103466 A1* | 6/2003 | McCann et al. | 370/252 |
| 2003/0108016 A1* | 6/2003 | Bonta | 370/338 |
| 2003/0142645 A1* | 7/2003 | Belcea | 370/330 |
| 2003/0147408 A1* | 8/2003 | Datta et al. | 370/401 |
| 2003/0157951 A1 | 8/2003 | Hasty, Jr. | |
| 2003/0235174 A1* | 12/2003 | Pichna et al. | 370/338 |
| 2003/0235175 A1* | 12/2003 | Naghian et al. | 370/338 |
| 2004/0114539 A1* | 6/2004 | Beshai et al. | 370/254 |
| 2004/0131025 A1* | 7/2004 | Dohler et al. | 370/328 |
| 2004/0190476 A1* | 9/2004 | Bansal et al. | 370/338 |
| 2004/0192204 A1* | 9/2004 | Periyalwar et al. | 455/25 |
| 2004/0193729 A1* | 9/2004 | Saraph | 709/241 |
| 2004/0205105 A1* | 10/2004 | Larsson et al. | 709/200 |
| 2004/0233918 A1* | 11/2004 | Larsson et al. | 370/400 |
| 2005/0122231 A1* | 6/2005 | Varaiya et al. | 340/870.01 |
| 2006/0045011 A1* | 3/2006 | Aghvami et al. | 370/230 |
| 2006/0046658 A1* | 3/2006 | Cruz et al. | 455/67.11 |
| 2006/0092913 A1* | 5/2006 | Joseph et al. | 370/351 |
| 2006/0140135 A1* | 6/2006 | Bonta et al. | 370/254 |
| 2006/0176829 A1* | 8/2006 | McLaughlin et al. | 370/252 |

FOREIGN PATENT DOCUMENTS

| | | |
|---|---|---|
| WO | WO 03/051009 A1 | 6/2003 |
| WO | WO 03/071818 A3 | 8/2003 |

OTHER PUBLICATIONS

Li, Q., et al, "Online Power-Aware Routing in Wireless Ad-hoc Networks," Proceedings of the 7$^{th}$ Annual Int'l Conf. on Mobile Computing and Networking, Rome, IT, Jun. 16, 2001, pp. 96-107.

Broch, J. et al., "The Dynamic Source Routing Protocol for a Mobile Ad Hoc Network," Carnegie Mellon University, IETF, Mar. 13, 1998, 38 pages.

Weiselthier, J.E. et al., "Resource Management in Energy-Limited, Bandwidth-Limited, Transceiver-Limited Wireless Networks for Session-Based Mulitcasting," Computer Networks, vol. 39, pp. 113-131 (2002).

Stojmenovic, I., et al., "Power-Aware Localized Routing in Wireless Networks," IEEE Trans. on Parallel and Distrib. Sys., vol. 12, No. 11, pp. 1122-1133 (Nov. 2001).

Toh, C.K., "Maximum Battery Life Routing to Support Ubiquitous Mobile Computing in Wireless Ad Hoc Networks," IEEE Commun. Magazine, Jun. 2001, pp. 138-147.

Chang, J-H, et al., "Energy Conserving Routing in Wireless Ad-Hoc Network," Proceedings IEEE Infocom 2000, 19$^{th}$ Annual Jt. Conf. of the IEEE Computer and Commun. Socs., Tel Aviv, IS, Mar. 26, 2000, 10 pages.

* cited by examiner

MOBILE TELEPHONE NETWORK

BACKGROUND TO THE INVENTION

This invention relates to a method of operating a mobile telephone network, in particular a mobile ad hoc network, and to a mobile unit for use in such a method.

A mobile ad hoc network is usually superimposed on a conventional cellular network and involves data routes using nodes, usually provided by mobile units, as intermediate points, for example between a mobile unit and a base station.

In mobile ad hoc networks (MANETs), various communication devices with different features comprise a wireless network that has no fixed infrastructure and unpredictable connectivity. These nodes are not only the means to data interchange but also the managers for the routes to data and access to services. Many mobile devices in a MANET are likely to be battery operated, making energy exhaustion an important issue for network stability. As a consequence, energy consumption should be regarded as an essential metric in any MANET routing mechanism. See Cano, J.-C.; Dongkyun Kim, "Investigating performance of power-aware routing protocols for mobile ad hoc networks," Mobility and Wireless Access Workshop 2002, MobiWac 2002. Many currently proposed power aware routing schemes are based on minimal total transmission power (MTTP), obvious examples being localized routing (LR) (Stojmenovic and X. Lin, "Power-aware Localized Routing in wireless Networks." Parallel and Distributed Systems, IEEE Transactions on, Volume: 12 Issue: 11, November 2001), or residual battery energy (RBE), or conditional max-min battery capacity routing (CMMBCR) (C.-K. Toh, "Maximum Battery Life Routing to Support Ubiquitous Mobile Computing in Wireless Ad Hoc Networks," IEEE Communications Magazine, June, 2001).

However, it is impractical to obtain an accurate value of the transmission power for MTTP, as this is dependant on the distance between nodes. In particular, the power needed to guarantee the transmission quality between two nodes can be estimated from $k \cdot d^\lambda$, where d is the distance between the nodes, k is the constant for estimation and $\lambda$ is a value between 2 and 4. Because of the mobility of the nodes, d is difficult to obtain. GPS (the global positioning system) has been proposed to compute the distance, but this is an expensive option.

Moreover, the average end-to-end delay is increased due to the selection of routes with multiple hops.

When using RBE, more traffic load will be put on the node with the highest residual battery energy, which may result in rapid energy exhaustion. Consequently mechanisms based on such metrics cannot guarantee that the route can survive for the duration of an integrated service. For example, the service may comprise sending a 5 Mbit file from a source node to another node. The source node will invoke the route discovery procedure to find a proper route to send the file. If any node along the discovered route does not have enough energy to fulfil this service, then the transmission will be terminated and another route discovery procedure must be invoked, thus introducing inefficiency and wasting energy.

A low route survival probability (RSP) means the route is likely to become invalid during an integrated service, which will lead to unstable network connectivity and additional route discovery operations. This would require additional energy expenditure, especially under conditions of heavy traffic load.

SUMMARY OF THE INVENTION

It is an aim of the invention to provide a new metric and a new routing mechanism which increases the RSP and supports integrated services with high power efficiency.

The present invention provides a method of operating a mobile ad hoc network according to claim 1 and a mobile unit according to claim 8. Preferred or optional features of the invention are defined in the dependent claims.

BRIEF DESCRIPTION OF THE DRAWINGS

The invention will now be described in detail, by way of example only, with reference to the accompanying drawings, in which.

DETAILED DESCRIPTION OF PARTICULAR EMBODIMENTS

Figure 1:
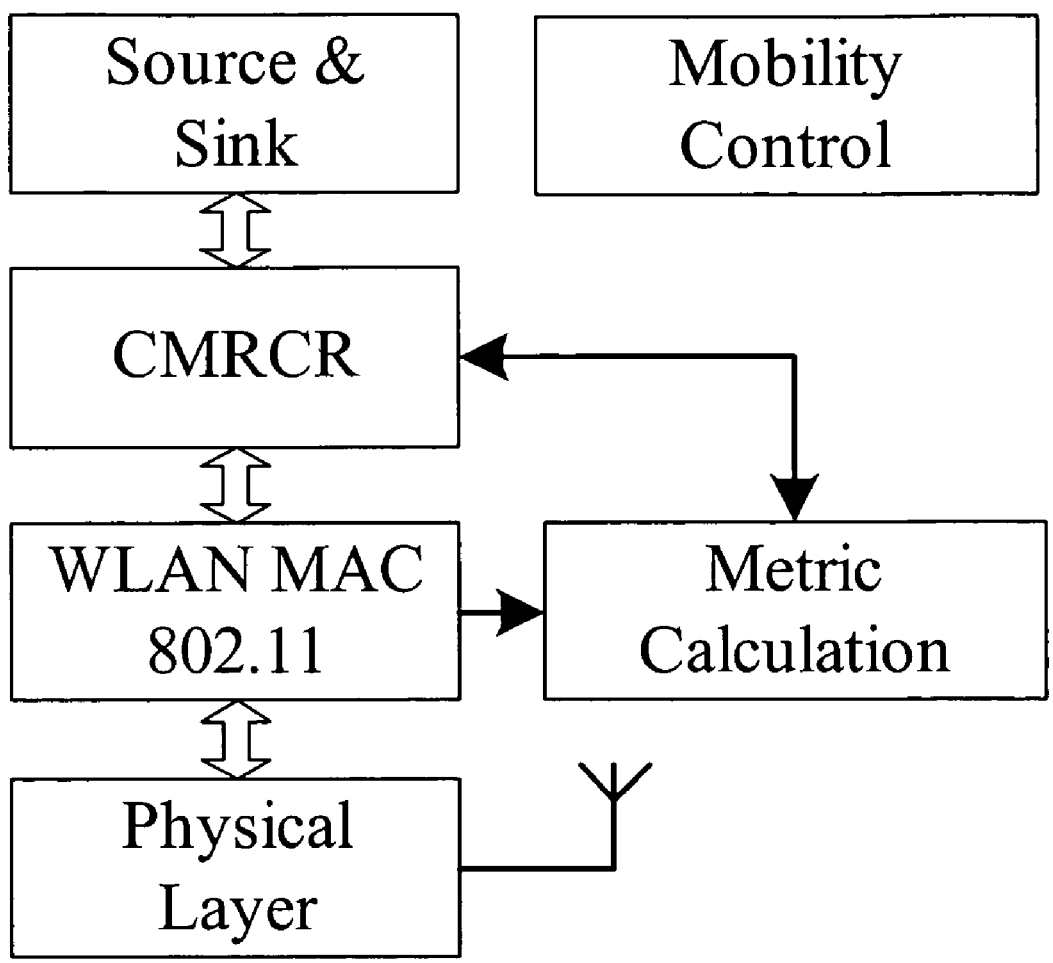
FIG. 1 shows a node simulation architecture in a simulation demonstrating an embodiment of the invention.

In a practical MANET, the capability of a resource-limited node to transmit is of great concern. This relates not only to the residual energy but also to the data rate and energy efficiency. We define a novel metric, relay capacity (RC), which is constrained by a relay efficiency (RE) metric, to specify the node's capability to transmit and its energy efficiency.

$RC_i$ indicates the traffic capacity that the node i can support, which can be defined as:

$$RC_i = L_i D_i \qquad (1)$$

where $D_i$ is the current data rate and $L_i$ is the lifetime of the node i. The unit of $RC_i$ is the bit. The lifetime $L_i$ can be described as:

$$L_i = E_i(t)/\overline{R_i(t)} \qquad (2)$$

where $E_i(t)$ is the node's residual energy. We also define $R_i(t) = \partial E_i(t)/\partial t$ to indicate how much energy is used per second at node i.

In order to obtain the average trend of $R_i(t)$, an $\alpha$ low-pass filter is applied to $R_i(t)$, to give:

$$\overline{R_i(t)} = \alpha \cdot R_i(t-T) + (1-\alpha) \cdot R_i(t) \qquad (3),$$

where T is the sample period of $R_i(t)$. $\alpha$ and T have to be chosen carefully to accurately reflect the energy consumption of a node. $RC_i$ can be used to determine whether the node i will be available under a specified traffic load or not. Another important parameter to denote the node energy feature is $RE_i$, which describes the efficiency of the energy consumption in node i. We specify $RE_i$ as:

$$RE_i = D_i/\overline{R_i(t)} \qquad (4),$$

clearly, $RE_i$ can be used as the constraint condition to select the most efficient nodes.

The conditional maximum relay capacity routing (CMRCR) mechanism is based on $RC_i$ and $RE_i$. In the CMRCR, we define the relay capacity function of the route $r_j$ as:

$$\phi(r_j) = \min_{\forall n_i \in r_j} RC_i \quad (r_j \in r^*) \quad (5)$$

where r* is the set of all possible routes with the same source node $n_0$ and the destination node $n_d$. $n_i$ is one of the nodes in route $r_j$. During the route discovery routine, the source node should attach the value of the traffic load $T_{Load}$ of the whole service to the route request packet, which specifies how much data each node in the route should relay. Then r** is the set of the possible routes, which satisfy the condition:

$$\phi(r_j) \geq T_{Load} (\forall r_j \in r^*) \quad (6)$$

We also define the route energy efficiency as:

$$\eta(r_j) = \frac{1}{N_j} \sum_{n_i} RE_i \quad (\forall r_j \in r^{**} \in r^*) \quad (7)$$

where $N_j$ is the node number of the route j.

The optimal route $r_{opt}$ is the one, which satisfies the following condition:

$$\eta(r_{opt}) = \max_{\forall r_j \in r^{**}} \eta(r_j) \quad (8)$$

If r**=φ, then select the route which satisfies the condition:

$$\phi(r_{opt}) = \max_{\forall r_j \in r^*} \phi(r_j) \quad (9)$$

In this case, a message should feed back to the source node to inform it that there are no routes able to support the integrated transmission. The source node will then either cancel this transmission or divide up the transmission to fit the route conditions.

We modify the dynamic source routing (DSR) protocol (David B. Johnson, and David A. Maltz et al., "The Dynamic Source Routing Protocol for Mobile Ad Hoc Networks (DSR)," Internet Draft, draft-ierf-manet-dsr-07.txt, February 2002, work in progress) to act as the underlying route discovery and maintenance protocol, and to compare the performance of CMRCR against DSR and LR and CMMBCR.

Simulation Details: We developed a 40-node MANET simulation environment in Network Simulator 2 (NS2), which is commercially available. The nodes are randomly located in a 600 m×600 m area. The node simulation architecture is illustrated in FIG. 1. Each node's speed is selected from a uniform probability distribution function (PDF) with a maximum speed of 10 ms$^{-1}$ and the nodes adopt IEEE802.11 as the MAC strategy. The metric calculation (MC) detects the total transmission time $t_{tx}$ and the receiving time $t_{rx}$, and calculates the energy consumed in the node i in the refresh period T using the following equation:

$$E_i = I_{tx} \times V \times t_{tx} + I_{rx} \times V \times t_{rx} \text{ (Joules)} \quad (10)$$

where $I_{tx}$ is the transmission current and $I_{rx}$ is the receiving current. They are 280 mA and 240 mA respectively (Laura Marie Feeney and Martin Nilsson, "Investigating the Energy Consumption of a Wireless Network Interface in an Ad Hoc Networking Environment," IEEE INFOCOM, Anchorage, Ak., 2001). The voltage V is 5V in our simulation. Because the MC detects the operation of the MAC layer, the energy expended in over-hearing packets is also included. The node's energy is initialised using an exponential PDF with an average of 9000 J. We use T=5 s and α=0.25. The source node selects the packet-sending interval from an exponential PDF with the average value 0.5 s. The packet length is fixed at 1024 bits. In each integrated service, a file, whose length is taken from an exponential PDF with the average value 5 Mbits, is sent to a random destination address.

Simulation Results and discussion: In our simulation, we compare the performance based on route survival probability, the average residual energy and other measures of pure DSR, LR and CMMBCR.

Figure 2:
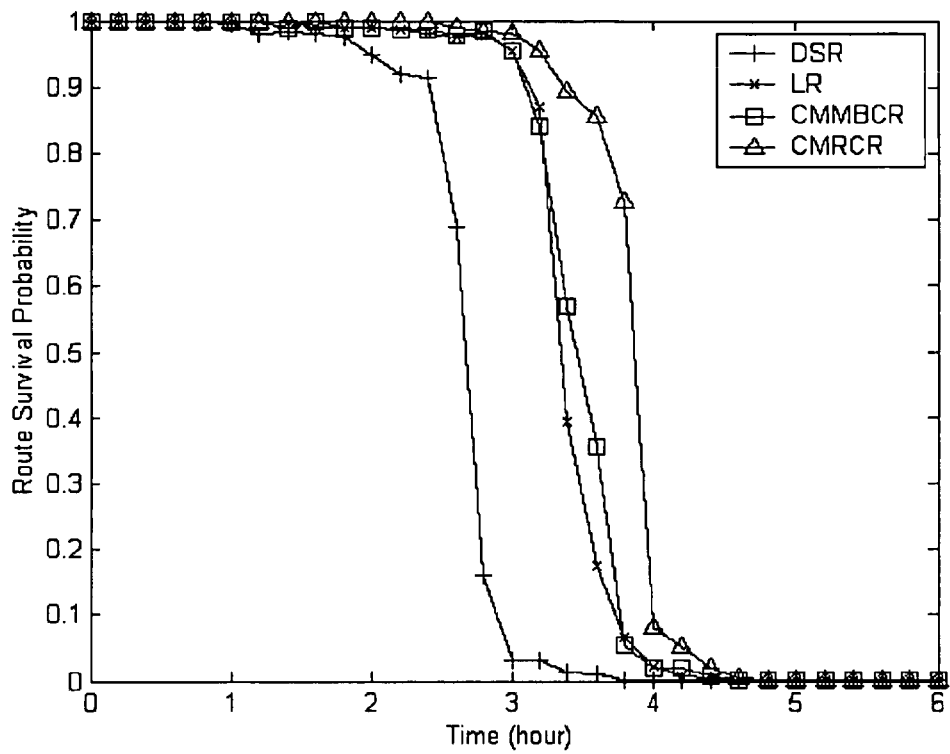
FIG. 2 shows RSP results of the simulation.

I. Route survival probability (RSP): If the route is invalid during the integrated service, a new route discovery operation must be executed to finish the data transmission, or the transmission should be abandoned, thus energy will be wasted. The RSP simulation results are illustrated in FIG. 2. From the results, we can see that CMRCR results in the highest RSP with a service half an hour longer than provided by LR and CMMBCR, and over one hour more than DSR alone. This suggests more integrated services can be fulfilled without route rediscovery. After about 4 hours, the RSP drops sharply due to energy exhaustion of most of the nodes. Clearly, the CMRCR mechanism can significantly improve the RSP, resulting in a more robust network connectivity.

II. Node average residual energy (NARE): The NARE can be expressed as:

$$E_{NARE}(t) = \frac{1}{N} \sum_{i=0}^{N-1} E_i(t) \quad (11)$$

where N is the number of mobile nodes in the simulation scenario.

Figure 3:
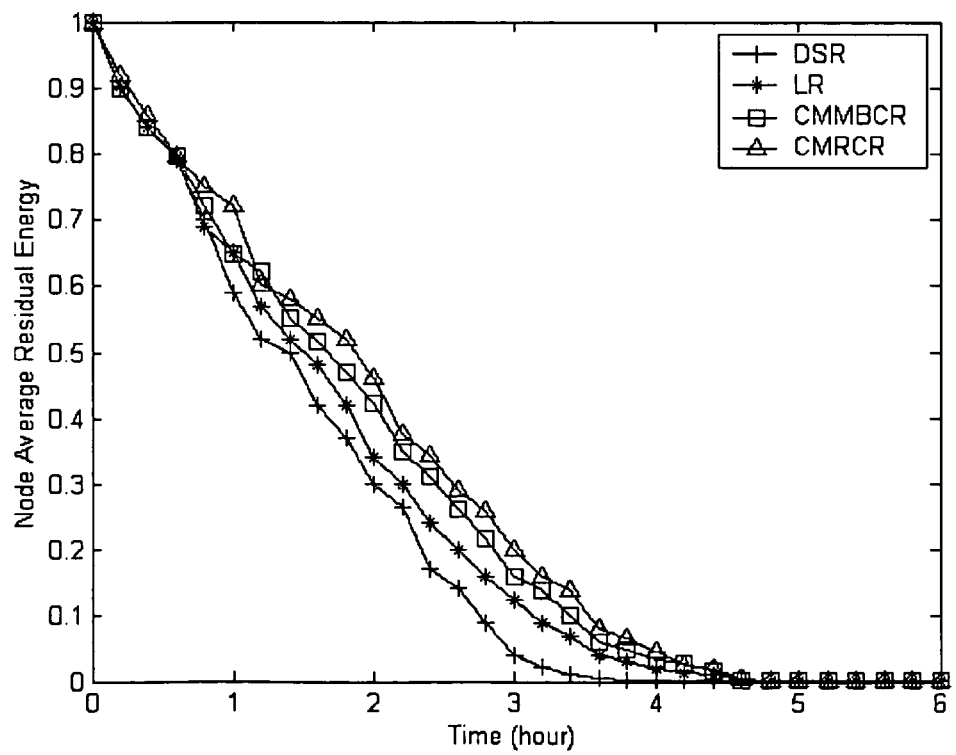
FIG. 3 shows node average residual energy (NARE) results of the simulation.

The NARE simulation result is illustrated in FIG. 3, which shows that the CMRCR mechanism can prolong battery lifetime. The reason is that this mechanism decreases the time spent on route discovery and selects the route with lower energy consumption.

III. Other characteristics: The mean end-to-end delay and the mean hop count are listed in the table. All mechanisms show similar performance results.

| Measure | DSR | LR | CMMBCR | CMRCR |
| --- | --- | --- | --- | --- |
| Mean End-to-end Delay (s) | 0.0372 | 0.0382 | 0.0384 | 0.0377 |
| Mean Hop Count | 2.86 | 2.94 | 2.89 | 2.91 |

CONCLUSION

The CMRCR mechanism, based on RC and RE, improves route survival probability, thus avoiding extra route discovery operations, and ensuring more robust network connectivity. CMRCR selects an economical route with respect to energy consumption as it is constrained by RE. Many on-demand or on-table routing methods can be modified to use CMRCR as the underlying route discovery and maintenance protocol.

It will be appreciated that the invention provides a novel metric and a routing mechanism with high route survival probability in power-aware mobile ad hoc networks. The simulations show that the invention can provide energy saving with significantly more robust connectivity.

All forms of the verb "to comprise" used in this specification have the meaning "to consist of or include".

We claim:

1. A method of routing a specific volume of data in a mobile ad hoc network, comprising finding a relay capacity of each of a plurality of nodes as the product of an instantaneous bit-rate of each said node and a lifetime of the node, wherein the lifetime of the node is determined as a ratio of a residual energy of the node divided by a time rate of energy use at a bit rate of the node, and determining from the relay capacity whether said node will be able to relay said data in a proposed route.

2. A method according to claim 1, wherein the lifetime of the node is found by dividing a residual energy of the node by an average power consumption of the node.

3. A method according to claim 2, wherein the average power consumption of the node is found by applying a low pass filter to a monitored power consumption value.

4. A method according to claim 1, wherein a relay efficiency of the node is found by dividing the instantaneous bit-rate of the node by an average power consumption of the node.

5. A method according to claim 1, wherein for each of a plurality of nodes in a proposed route, it is determined whether said node will be able to relay said data, and if all of the nodes in the route will be able to relay said data, said proposed route is added to a set of possible routes.

6. A method according to claim 5, wherein a source node for the data attaches a value for a traffic load of the data to a route request, and send said route request to neighbour nodes in order to determine whether said neighbour nodes will be able to relay the data.

7. A method according to claim 5, wherein a relay efficiency of each node is found by dividing the instantaneous bit-rate of the node by an average power consumption of the node and, for each of the possible routes in the set, a route energy efficiency is found by dividing a sum of a relay efficiency of all of the nodes in the route by a number of nodes in the route, and the route with a highest route efficiency is selected as the route for the data.

8. A mobile unit for use in a mobile ad hoc network, the mobile unit being operable to find a relay capacity of a node as the product of an instantaneous bit-rate of the node and a lifetime of the node, wherein the lifetime of the node is determined as a ratio of a residual energy of the node divided by a time rate of energy use at a bit rate of the node, and to determine from the relay capacity whether said node will be able to relay a specific volume of data.

9. A mobile unit according to claim 8, operable to determine, for each of a plurality of nodes in a proposed route, whether said node will be able to relay said data, and to add said proposed route to a set of possible routes if all of the nodes in the proposed route will be able to relay said data.

10. A mobile unit according to claim 9, operable to find a route energy efficiency of each of the possible routes in the set by dividing a sum of a relay efficiency of all of the nodes in a plurality of routes by a number of nodes in the respective route, and to select a route with a highest route efficiency as the route for the data.

11. A method of routing data in a mobile ad hoc network, comprising:
finding a relay capacity of each of a plurality of nodes, the relay capacity being the product of an instantaneous bit-rate of each said node times a lifetime of the node,
wherein the lifetime of the node is determined as a ratio of a residual energy of the node divided by a time rate of energy use at a bit rate of the node, and
determining from the relay capacity whether said node will be able to relay a specific volume of data in a proposed route because the relay capacity is at least equal to the specific volume.

* * * * *